US009317069B2

(12) United States Patent
Chen (10) Patent No.: US 9,317,069 B2
(45) Date of Patent: Apr. 19, 2016

(54) ELECTRONIC DEVICE ENCLOSURE (71) Applicant: HON HAI PRECISION INDUSTRY CO., LTD., New Taipei (TW)

(72) Inventor: Yi-Ru Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/554,569

(22) Filed: Nov. 26, 2014

(65) Prior Publication Data

US 2015/0156904 A1 Jun. 4, 2015

(30) Foreign Application Priority Data

Nov. 30, 2013 (CN) .......................... 2013 1 0622996

(51) Int. Cl.
*A47B 81/00* (2006.01)
*G06F 1/16* (2006.01)
(52) U.S. Cl.
CPC ............ *G06F 1/1656* (2013.01); *G06F 1/1616* (2013.01)
(58) Field of Classification Search
CPC ................................. G06F 1/181; A47B 91/00

USPC ................... 312/223.2, 351.1, 351.3, 351.13; 361/679.59; 248/188.8, 188.9, 677
See application file for complete search history.

(56) References Cited

U.S. PATENT DOCUMENTS

| 2,217,249 | A | * | 10/1940 | Flower .......................... 24/580.1 |
| 3,401,908 | A | * | 9/1968 | Rapata ........................ 248/188.8 |
| 3,407,454 | A | * | 10/1968 | Myatt ............................ 411/549 |
| 3,858,752 | A | * | 1/1975 | Marvin et al. ................. 220/325 |
| 3,966,340 | A | * | 6/1976 | Morris ........................... 403/353 |
| 4,770,586 | A | * | 9/1988 | Osterland ..................... 411/349 |
| 2011/0050056 | A1 | * | 3/2011 | Yang et al. .................. 312/223.1 |
| 2011/0203495 | A1 | * | 8/2011 | McLaughlin ............. 108/144.11 |

* cited by examiner

*Primary Examiner* — Matthew Ing
(74) *Attorney, Agent, or Firm* — Novak Druce Connolly Bove + Quigg LLP (57) ABSTRACT

An electronic device enclosure includes a base and a footpad. The base includes a bottom plate having an outer surface and an inner surface opposite to the outer surface. A receiving slot is defined in the bottom plate. The footpad includes a securing member and a rotating member rotatably attached to the securing member. The rotating member includes a clipping portion. The securing member is detachably attached to the inner surface of the bottom plate, the rotating member is attached to the outer surface of the bottom plate, and the clipping portion extends though the receiving slot to engage with the securing member.

17 Claims, 7 Drawing Sheets

ELECTRONIC DEVICE ENCLOSURE

FIELD

The present disclosure relates to electronic device enclosures, and particularly to an electronic device enclosure with footpads.

BACKGROUND

Electronic devices, such as notebook computers, usually comprise a plurality of footpads attached on a bottom plate to prevent the electronic devices from moving. The footpad is generally secured to the bottom plate by screws.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an electronic device enclosure comprising a base and a footpad. The base comprises a bottom plate having an outer surface and an inner surface opposite to the inner surface. A receiving slot is defined in the bottom plate. A footpad comprises a securing member and a rotating member rotatably attached to the securing member. The rotating member comprises a clipping portion. The securing member is detachably coupled to the inner surface of the bottom plate, the rotating member is attached to the outer surface of the bottom plate, and the clipping portion extends though the receiving slot to engage with the securing member.

Figure 1:
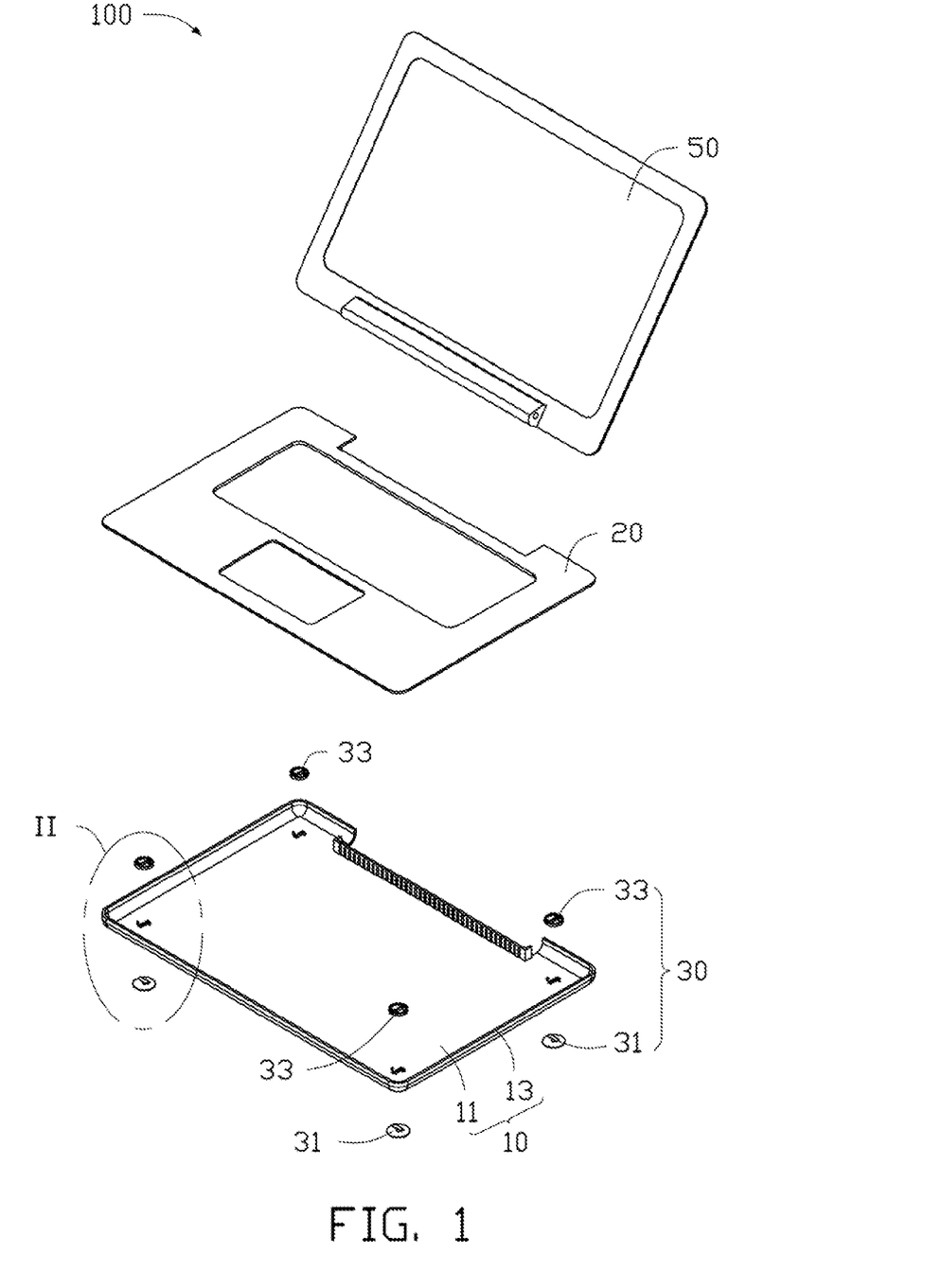
FIG. 1 is an exploded, isometric view of an electronic device enclosure in accordance with an embodiment.
Figure 2:
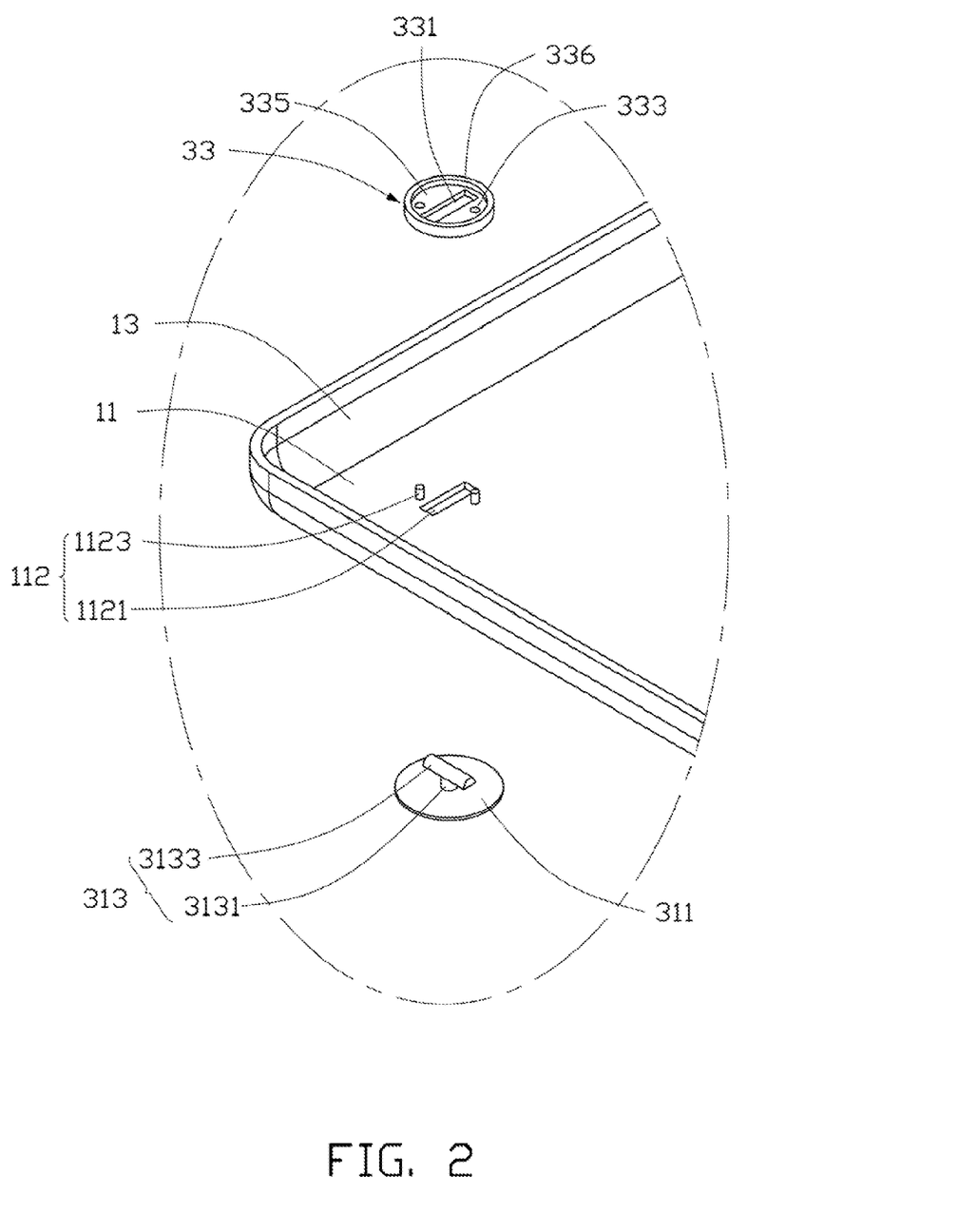
FIG. 2 is an enlarged view of a circled portion II of the electronic device enclosure of FIG. 1.
Figure 3:
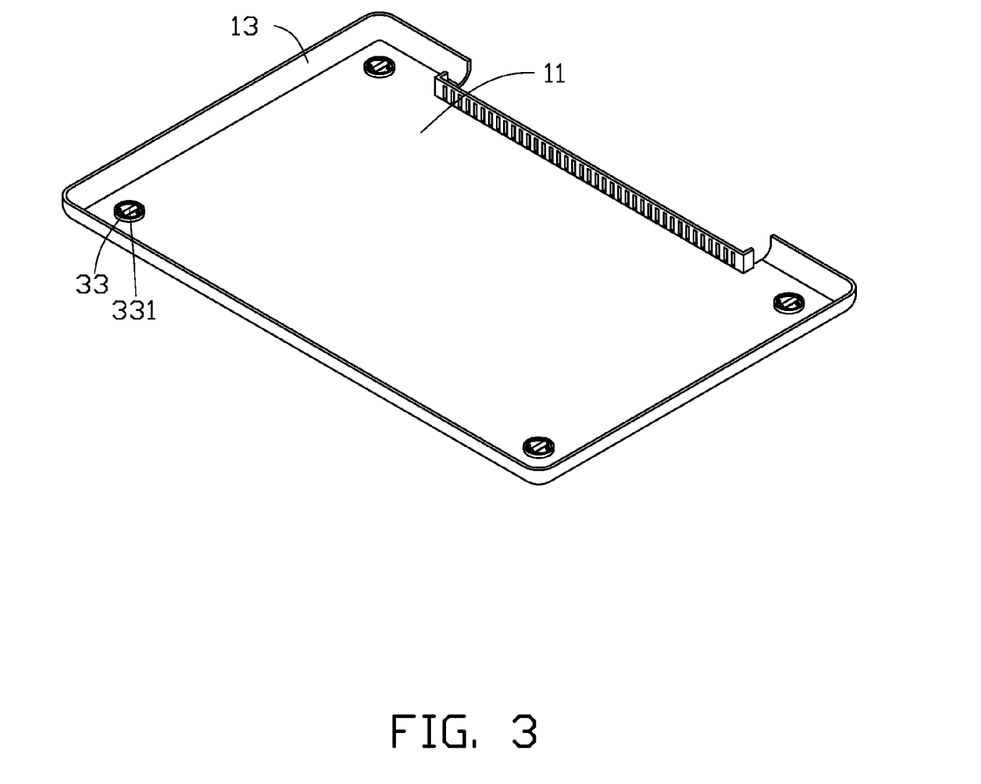
FIG. 3 is assembled view of a base and four footpads of the electronic device enclosure of FIG. 1, and a rotating member of each footpad is located in a first position.
Figure 4:
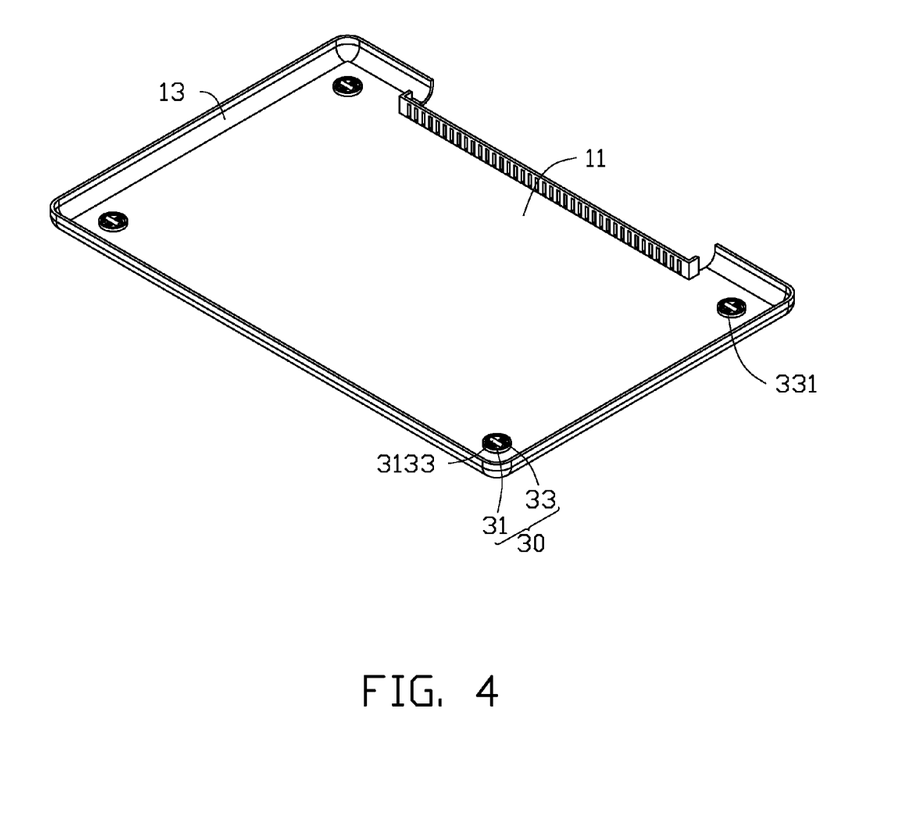
FIG. 4 is similar to FIG. 3, and the rotating member of each footpad is located in a second position.
Figure 5:
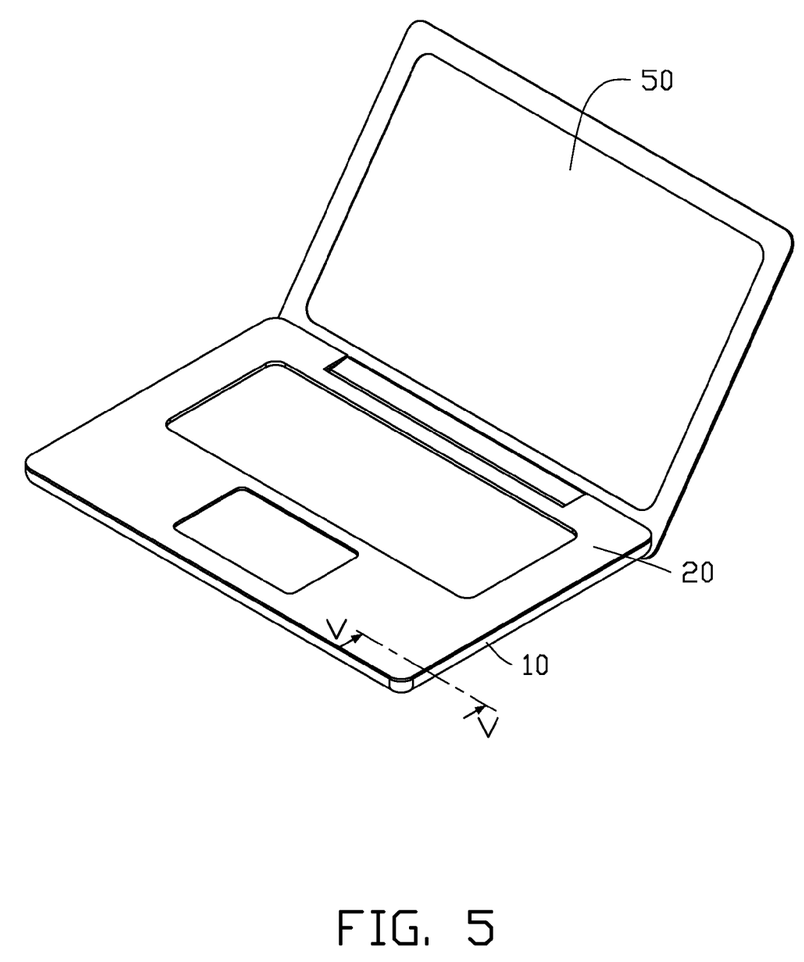
FIG. 5 is an assembled view of the electronic device enclosure of FIG. 1.
Figure 6:
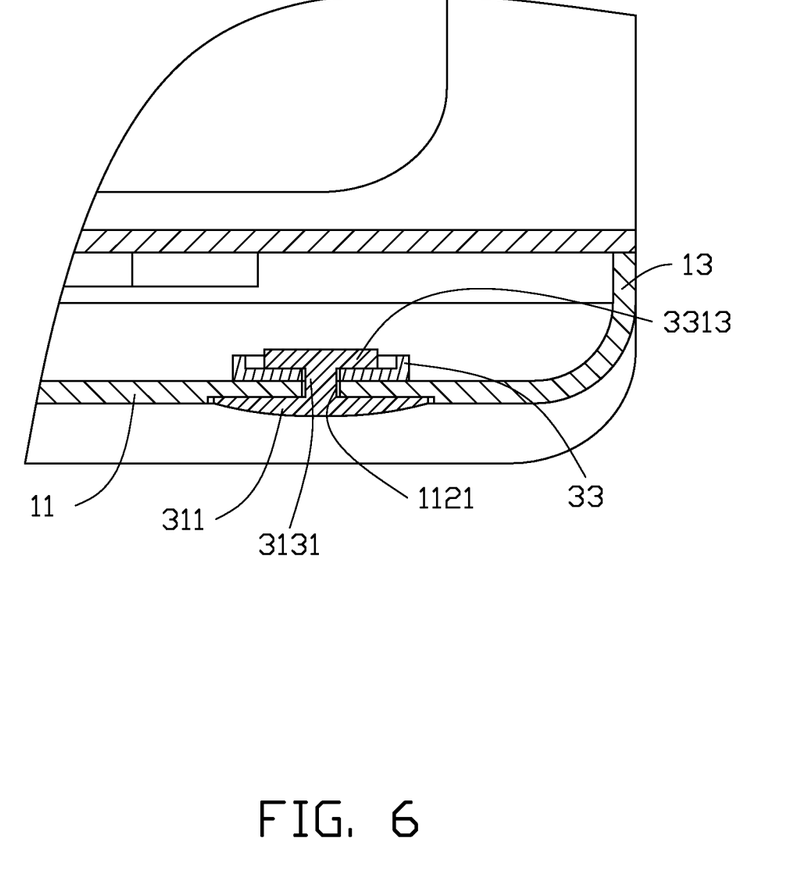
FIG. 6 is a cross-sectional view of FIG. 5, taken along a line VI-VI, and the rotating member of each footpad is located in the first position.
Figure 7:
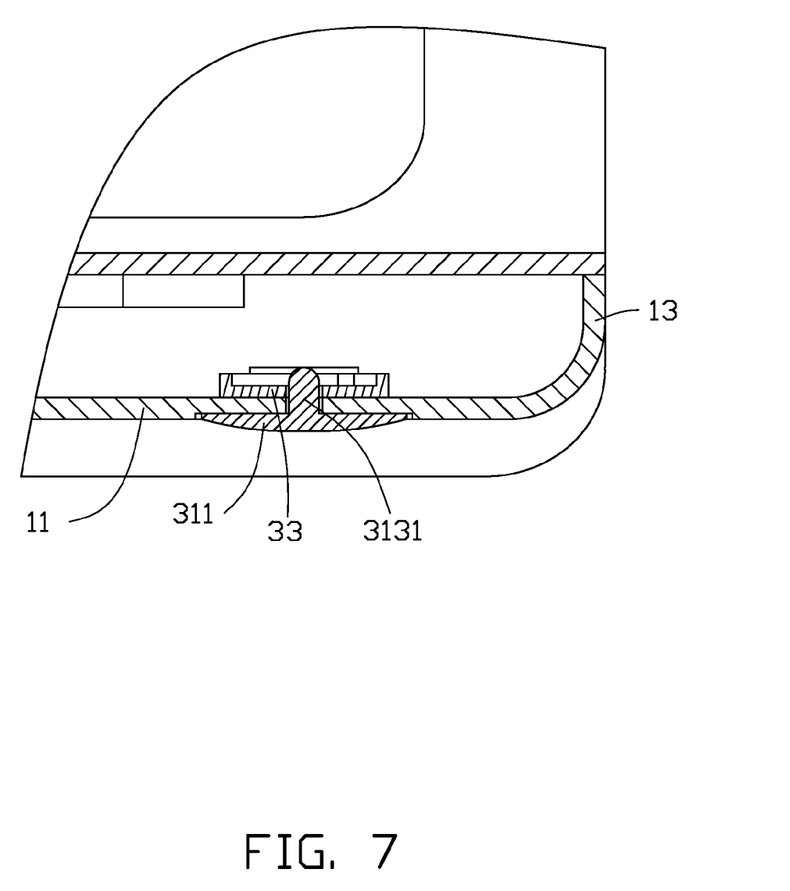
FIG. 7 is similar to FIG. 3, and the rotating member of each footpad is located in the second position.

FIGS. 1-2 illustrate an embodiment of an electronic device enclosure 100. The electronic device enclosures 100 comprising a base 10, a panel 20 attached to the base 10, four footpads 30, and a display 50 rotatably attached to the base 10. In at least one embodiment, the electronic device enclosure 100 is an enclosure of a notebook computer, a table computer, and a digital photo frame.

The base 10 comprises a bottom plate 11 and four side plates 13 extending from the bottom plate 11. The bottom plate 11 is substantially rectangular, and a mounting assembly 112 is located on each corner of the bottom plate 11. The mounting assembly 112 comprises a receiving slot 1121 defined in the bottom plate 11 and two positioning posts 1123 arranged at opposite sides of the receiving slot 1121. In at least one embodiment, the receiving slot 1121 is substantially rectangular, one positioning post 1123 is located adjacent to a first edge of the receiving slot 1121, and another positioning post 1123 is located adjacent to a second edge of the receiving slot 1121, which is opposite to the first edge.

Each footpad 30 comprises a rotating member 31 and a securing member 33 engaged with the rotating member 31. The rotating member 31 comprises a supporting portion 311 and a clipping portion 313 extending from the supporting portion 311. A cross-section of the supporting portion 311 is substantially circular. The clipping portion 313 comprises a connecting post 3131 and a clipping post 3133 coupled to the connecting post 3131. The connecting post 3131 is substantially perpendicular to the supporting portion 311. A length and a width of the clipping post 3133 are substantially equal to a length and a width of the receiving slot 1121. A longitudinal section of the clipping post 3133 is substantially semi-circular. The clipping portion 313 can be substantially T-shaped, and the clipping post 3133 can be substantially parallel to the supporting portion 311. The securing member 33 defines a through slot 331 and two positioning holes 333. The through slot 331 is substantially rectangular, and a length and a width of the through slot 331 are substantially equal to a length and a width of the receiving slot 1121. Thus, the clipping portion 313 can extend through the through slot 331. The securing member 33 comprises a bottom wall 335 and a ring-shaped sidewall 336. The bottom wall 335 is surrounded by the sidewall 336. The through slot 331 and the two positioning holes 333 are defined in the bottom wall 335. The clipping portion 313 is rotatable to engage with the securing member 33 within the ring-shaped sidewall 336.

FIGS. 3-7 illustrate an assembly of the electronic device enclosure. The securing member 33 of each footpad 30 is attached to an inner surface of the bottom plate 11, and the two positioning posts 1123 are engaged in the corresponding positioning holes 333 to secure the securing member 33 to the bottom plate 11. The through slot 331 is aligned with the receiving slot 1121.

The rotating member 31 is attached to an outer surface of the bottom plate 11. The clipping portion 313 is aligned with the receiving slot 1121 and the through slot 331 and extends through the receiving slot 1121 and the through slot 331. At this time, the rotating member 31 is located in a first position (see FIG. 3), and the clipping portion 313 is aligned with the receiving slot 1121 and the through slot 331. The rotating member 31 is rotated in a first direction, until the clipping portion 313 is blocked by the two positioning posts 1123 to prevent the rotating member 31 from moving, the clipping portion 313 can be clipped to the securing member 33 and located in a second position (see FIG. 4).

The panel 20 is secured to the base 10 by known means, such as clips or screws. The display 50 is rotatably secured to the base 10 by known means, such as hinge.

In disassembly of the footpad 30, the panel 20 is detached from the base 10. The rotating member 31 is rotated in an opposite direction, so that the rotating member 31 can be located in the first position for allowing the clipping portion 313 to align with the receiving slot 1121 and the through slot 331. The rotating member 31 is moved to disengage the clipping portion 313 from the receiving slot 1121 and the through slot 331. Thus, the rotating member 31 can be detached from the base 10. The two positioning posts 1123 are disengaged from the two positioning holes 333, so that the securing member 33 can be detached from the bottom plate 11. Therefore, the footpad 30 can be disengaged from the base 10.

The embodiments shown and described above are only examples. Many details are often found in the art such as the other features of a base. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An electronic device enclosure comprising:
   a base comprising a bottom plate defining a receiving slot, an outer surface and an inner surface opposite to the outer surface; and
   a footpad comprising a securing member detachably attached to the inner surface of the bottom plate and a rotating member attached to the outer surface of the bottom plate comprising a connecting post and a clipping portion that extends through the receiving slot and engages with the securing member;
   wherein the securing member comprises a bottom wall and a ring-shaped sidewall, the bottom wall is surrounded by the sidewall, and the clipping portion is rotatable within the ring-shaped sidewall.

2. The electronic device enclosure of claim 1, wherein the bottom wall defines two positioning holes, and two positioning posts are located on the bottom plate to engage in the two positioning holes.

3. The electronic device enclosure of claim 2, wherein the receiving slot is substantially a rectangle, the two positioning posts are arranged on opposite sides of the receiving slot, one positioning post is located adjacent to a first end of the receiving slot, and another positioning post is located adjacent to a second end of the receiving slot.

4. The electronic device enclosure of claim 1, wherein the bottom wall defines a though slot aligned with the receiving slot, the clipping portion is aligned with the receiving slot and the through slot, and the rotating member is rotatable relative to the securing member to prevent the clipping portion from disengaging from the receiving slot and the through slot.

5. The electronic device enclosure of claim 1, wherein the rotating member further comprises a supporting portion, and the supporting portion is attached to the outer surface of the bottom plate.

6. The electronic device enclosure of claim 5, wherein the connecting post is connected to the clipping portion and the supporting portion, the connecting post is substantially perpendicular to the supporting portion, and the clipping portion is substantially parallel to the supporting portion.

7. The electronic device enclosure of claim 1, wherein a cross-section of the supporting portion is substantially circular.

8. The electronic device enclosure of claim 1, wherein the clipping portion comprises a clipping post, a length and a width of the clipping post are substantially equal to a length and a width of the receiving slot.

9. The electronic device enclosure of claim 8, wherein a longitudinal section of the clipping post is substantially semicircular.

10. An electronic device enclosure comprising:
    a base comprising a bottom plate having an outer surface and an inner surface opposite to the outer surface, and a receiving slot defined in the bottom plate; and
    a footpad comprising a securing member and a rotating member rotatably attached to the securing member, the securing member detachably attached to the inner surface of the bottom plate and defining a through slot aligned with the receiving slot, and the rotating member comprising a clipping portion and a connecting post;
    wherein the securing member comprises a bottom wall and a ring-shaped sidewall, the bottom wall is surrounded by the sidewall, and the clipping portion is rotatable within the ring-shaped sidewall;
    wherein the clipping portion comprises a clipping post, a longitudinal section of the clipping post is substantially semicircular, the rotating member is rotatable relative to the securing member between a first position, where the clipping portion is aligned with the receiving slot and the through slot for being permitted to disengage from the receiving slot and the through slot, and a second position, where the clipping portion is engaged with the securing member to prevent to disengage from the receiving slot and the through slot.

11. The electronic device enclosure of claim 10, wherein the securing member defines two positioning holes, and two positioning posts are located on the bottom plate to engage in the two positioning holes.

12. The electronic device enclosure of claim 11, wherein the receiving slot is substantially a rectangle, the two positioning posts are arranged on opposite sides of the receiving slot, one positioning post is located adjacent to a first end of the receiving slot, and another positioning post is located adjacent to a second end of the receiving slot.

13. The electronic device enclosure of claim 10, wherein the rotating member further comprises a supporting portion, and the supporting portion is attached to the outer surface of the bottom plate.

14. The electronic device enclosure of claim 13, wherein the connecting post is connected to the clipping portion and the supporting portion, the connecting post is substantially perpendicular to the supporting portion, and the clipping portion is substantially parallel to the supporting portion.

15. The electronic device enclosure of claim 13, wherein a cross-section of the supporting portion is substantially circular.

16. The electronic device enclosure of claim 10, wherein a length and a width of the clipping post are substantially equal to a length and a width of the receiving slot.

17. The electronic device enclosure of claim 10, wherein the securing member comprises a bottom wall and a ring-shaped sidewall, the bottom wall is surrounded by the sidewall, and the clipping post is rotatable within the ring-shaped sidewall.

\* \* \* \* \*